April 21, 1970     R. H. MURDOCK     3,507,299
SAFETY ENGINE DRAIN PLUG
Filed Dec. 9, 1968
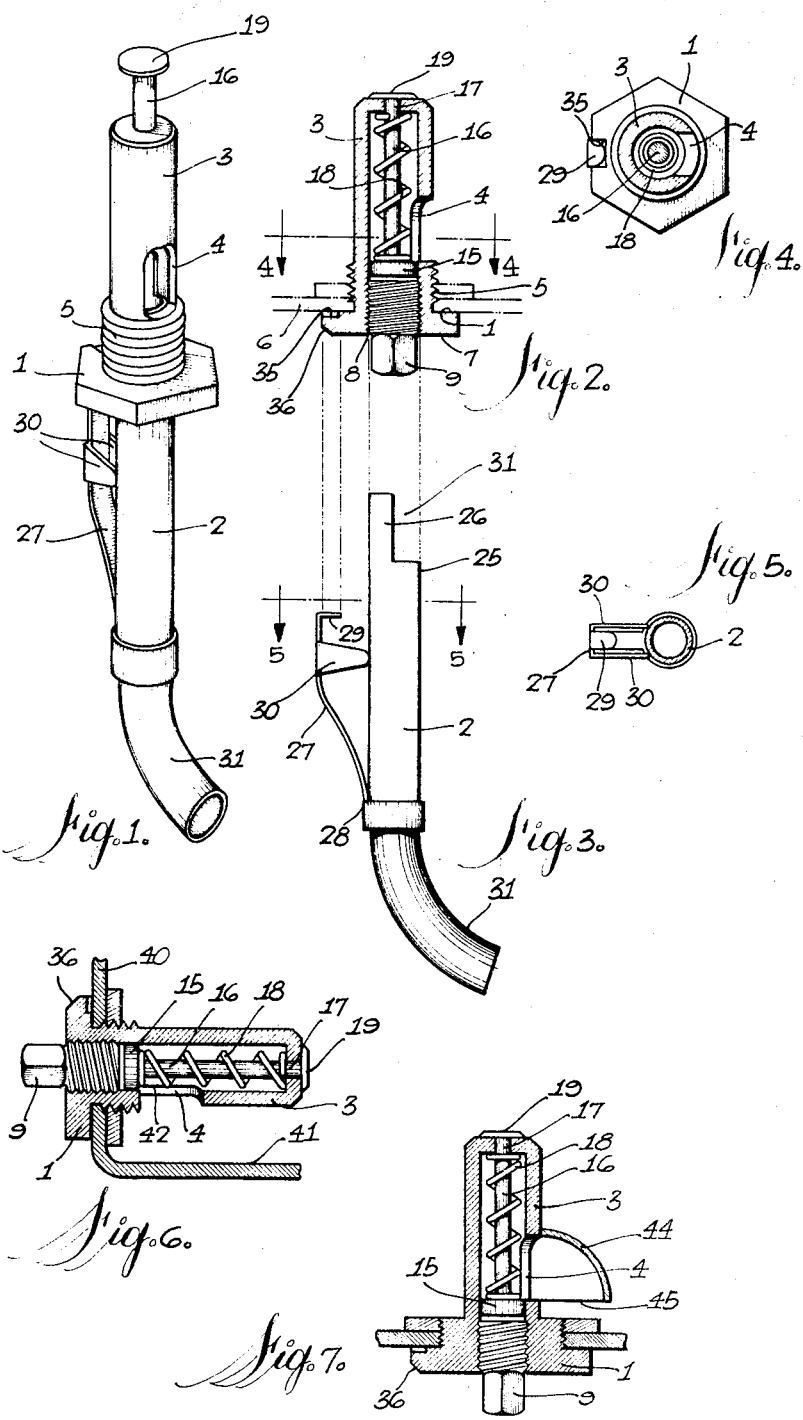

United States Patent Office 3,507,299
Patented Apr. 21, 1970

1

3,507,299
SAFETY ENGINE DRAIN PLUG
Robert H. Murdock, 4551 Notre Dame Blvd., Chomedey,
Laval, Quebec, Canada
Continuation-in-part of application Ser. No. 495,860,
Oct. 14, 1965. This application Dec. 9, 1968, Ser.
No. 782,226
Int. Cl. F16k 35/02
U.S. Cl. 137—322
10 Claims

ABSTRACT OF THE DISCLOSURE

A drainer for sumps, in which a hollow tubular plug is screwed into the wall of the sump, an axially movable valve being positioned in the plug. A port in the wall of the plug is normally covered by the valve, the port being uncovered when the valve is lifted by a tubular member inserted into the plug. The tubular member has a portion extending axially at its end, the end of the portion contacting the valve and displacing it axially as the tubular member is inserted. An opening in the side of the portion cooperates with the port for flow of fluid. The port in the wall of the plug is in direct communication with the bore of the tubular member when the valve is opened. No flow of fluid occurs until the tubular member is entirely entered into the plug.

---

This application is a continuation-in-part application of application Ser. No. 495,860, filed Oct. 14, 1965, now abandoned, in the name of the present applicant.

This application relates to drainers, particularly to drainers for internal combustion engines and other parts as used in automobile and marine engines, and is concerned with a drainer which permits draining of a sump or the like without removing a drain plug.

Normally, in automobile and marine engines, the engine sump, and other parts such as gear boxes and differentials, are drained by the removal of drain plugs. This is an inconvenient and dirty procedure, the oil often pouring out before the plug is completely clear, and the oil must be collected by positioning a container beneath the plug.

It is an object of the present invention to provide a drainer which, by the insertion of a tubular member into a hollow drain plug provided with a valve, permits easy and clean draining and also enables the oil to be conducted away through a pipe, if desired, to a convenient collecting point.

It is a further object of the invention to provide such a drainer with a tubular member which is rotatable in the drain plug, the tubular member controlling the flow of oil in accordance with its rotative position in the drain plug.

A further object of the invention is the provision of a drainer with a rotatable tubular member for insertion in the hollow drain plug in which the tubular member is provided with retaining and rotative positioning means.

Accordingly, there is provided a drainer comprising a hollow plug having an outlet and an axial hollow extension, the extension having a port therein for communication with the interior of the sump, a valve member axially movable in said extension to control fluid flow through said port to said outlet, and a tubular member for insertion in the outlet of the plug to move the valve axially and permit flow of fluid through the port and the tubular member.

By forming the port in the wall, or side, of the axial extension certain additional advantages can be obtained. In particular, by installing the drainer in a side wall of a sump or other chamber, with the port directed downwards towards the bottom surface of the chamber, a syphon effect with a sharp, substantially instantaneous, cut-off of flow is obtained. By installing the drainer very close to the bottom surface of the chamber substantially complete emptying is obtained rapidly and with the quick-cut-off of flow.

Another advantage of the port being in the wall of the extension is that the tubular member can be provided with an axial extension on one side and which in one rotative position prevents fluid flow and in another rotative position allows such flow.

A syphon effect, and quick cut-off of fluid flow, can also be obtained with a drainer installed vertically, in a bottom surface of a chamber, by providing a curved shield over the port, the shield forming a downwardly facing orifice for the flow of fluid to the port.

In a further feature, the tubular member is provided with a clip for retaining the tubular member in the drain plug and also rotatively positions the tubular member.

The invention will be understood from the following description of particular embodiments, by way of example, in conjunction with the accompanying drawings, in which:

FIGURE 1 is a perspective view of a sump drainer, with the tubular drain member inserted in the plug, FIGURE 2 is a cross-section of the plug on the longitudinal axis thereof, FIGURE 3 is a side view of the tubular drain member, FIGURE 4 is a cross-section on the line 4—4 of FIGURE 2, FIGURE 5 is a cross-section on the line 5—5 of FIGURE 3, FIGURE 6 is a cross-section, similar to FIGURE 2, showing installation in a side wall, and FIGURE 7 illustrates a modification of the plug in FIGURE 2.

FIGURE 1 shows an assembled drainer, comprising a hollow drain plug 1 and a tubular drain member 2. As assembled together in FIGURE 1, there is a passage-way or flow path right through the assembly. The two separate parts, drain plug 1 tubular member 2, are shown in FIGURES 2 and 3, respectively, in the same respective positions as in FIGURE 1.

As will be seen more clearly in FIGURE 2, the drain plug 1 has a hollow extension 3. In the side of the extension is formed a port 4. The plug 1 is threaded at 5 for screwing into the wall of the sump, indicated in phantom at 6. The plug 1 has a rectangular flange 7 to provide a means for screwing in the plug and to provide a sealing surface for cooperation with the wall 6. The plug has an outlet 8 which, as shown in FIGURE 2, is threaded. A plug 9 is used to close the outlet 8 when draining is not being carried out.

Within the extension 3 is mounted an axially movable valve 15. The valve cylindrical and has a peripheral surface in a close sliding fit in the bore of the plug. A valve stem 16 extends through a hole 17 in the end of the extension remote from the flange 7. A compression spring 18 is positioned around the valve stem 16, between the valve 15 and the end of the extension. The end of the valve stem 16 is rivetted over or otherwise enlarged at 19 to engage with the end of the extension 3 and limit the axial movement of the valve 15 under the action of the spring 18. Normally the valve 15 is moved axially by the spring so that it prevents access between the port 4 and the outlet 8, and thus prevents fluid flow through the port 4 and outlet 8 even when plug 9 is removed. The peripheral surface of the valve 15 forms the only seal, no seating being necessary.

FIGURE 3 shows the tubular drain member 2. The member has an upper end 25 which is a relatively close fit in the bore of the plug 1. The member 2 can be of tube of a size which provides the close fit or the member can be of any desirable cross-section and size with one end made to fit into the bore of the plug. In the example shown, there is a portion in the form of a tongue 26 extending axially on one side of the tubular member 2. The tongue 26 defines an opening 31 which cooperates with port 4 to provide a flow path for liquid when valve 15 is opened.

A spring clip 27 is attached at one end, 28, to the tubular member and is aligned with the tongue 26. The clip is bent over at its other end 29. Two lugs 30 maintain the end 28 at a minimum distance from the surface of the tube. The relative positions of the bent over end 29 and lugs 30 can also be seen in FIGURE 5. The end of the tubular member 2 remote from the extension can be curved as at 31, and a pipe can be attached to this end for conveying oil to a collecting point.

In use, the plug 9 is first removed, the valve 15 preventing any oil flowing out through the drain plug 1. The upper end 25, together with the tongue 26, is then inserted into the outlet 8 of the drain plug 1. As the tubular member is pushed in the end surface of the tongue 26 contacts the valve 15 and moves it axially against the spring 18. As will readily be seen from FIGURE 2, the tongue 26 can be of such a length that when the tubular member 2 is inserted into the plug 1, the full diameter of the upper end 25 is at least flush with the outer surface of flange 7 when the end of the tongue engages the valve 15, avoiding any leakage. As the valve moves it uncovers the port 4, with opening 31 moving progressively into further alignment with port 4, and oil is able to flow through.

The tubular member can be inserted with the tongue 26 and clip 27 in a position diametrically opposite the port 4, that is in the relative positions as shown in FIGURES 2 and 3. The tubular member is pushed in until the upper end 29 of the clip passes over the flange and engages with a detent 35 formed in the upper surface of the flange 7, as seen in FIGURE 4. An inclined slot 36 can be provided on the periphery of the flange 7 to enable the end 29 to deflect over the flange more easily. By inserting the tubular member in this manner, oil will flow as soon as the valve 15 starts to uncover the port 4, which may be inconvenient.

An alternative way of inserting the tubular member is with the tongue, and clip, in line with and on the same side as the port 4. As the tongue 26 contacts the valve it will push the valve up to uncover port 4, but the tongue 26 will then cover the port and prevent oil flowing out. The tubular member is pushed right in and the end 29 of the clip 27 can ride up onto the flange 7. If desired a slot can be provided similar to slot 36, to enable the end 29 to deflect out onto the periphery of the flange. A detent can also be provided at this position if a detent is provided, the valve 15 is fully withdrawn but no oil can flow through port 4 as it is closed by the tongue 26. When it is desired to allow the oil to flow, the tubular member is rotated, the end 29 of the clip 27 deflecting out, until the relative position shown in FIGURES 2 and 3 is reached. This rotation causes the tongue 26 to uncover the port 4 and oil can then flow out.

FIGURE 6 illustrates a particular way of installing a drainer, as in FIGURE 2, by means of which certain advantages are obtained. The drain plug 1 is installed in a side wall 40 of a sump or other chamber to be drained. The plug 1 is positioned as close as possible to a bottom surface 41 to provide as complete drainage as possible. However if drainage to some other level is required, the plug is installed at a corresponding level. The port 4 is positioned to face downward towards the bottom surface 41. In this form of installation, when the valve 15 is moved to open port 4 to the outside, a syphon effect is created which results in the oil, or other liquid, draining out very fast. Furthermore, this rapid draining continues as the liquid level falls until the surface of the liquid reaches the edge of port 4, indicated at 42. As soon as the surface of the liquid is at this level, air can enter through port 4 and the syphon effect is broken. The flow of liquid very quickly stops with substantially no dripping or dribbling. The rate of flow due to the syphon effect is higher than normal gravitational flow, and thus the advantages of fast draining and of rapid and clean shut-off are obtained.

A similar syphon effect, with rapid shut-off can be obtained with a drain plug installed vertically, by modifying the drain port 4. One way of doing this is illustrated in FIGURE 1. In this arrangement, the drain plug 1 is installed in a bottom surface 6, as in FIGURE 2. A hood 44 is positioned over port 4. Hood 44 prevents access to the port 4 except through the orifice 45 formed by the bottom edge of the hood and the outer surface of the plug 1. By this means, when the drain plug is opened by upward displacement of the valve 15, a syphon effect is obtained, and rapid draining as a result of such effect is maintained until the level of the surface of the liquid falls to the level of the bottom edge of the hood 44. As soon as the liquid level reaches this position, air can enter orifice 45 and the syphon effect is stopped. The flow of liquid rapidly stops, with substantially no dripping or dribbling.

It will be appreciated that variations can be made to the embodiments described and illustrated. The valve 15 does not have to be a very good fit in the bore of the extension 3, and can be fairly loose. Only slight leakage will occur past the valve, and this will be stopped by insertion of the plug 9.

The end 25 of the tubular member can have alternative means to the tongue 26 for lifting the valve 15. The only requirements are that there be an end surface to contact the valve 15 and that some form of opening be provided to cooperate with the port 4. Also, the clip 27 is only one of various ways of retaining and positioning the tubular member 2. A clip can be attached to the tubular member, the clip engaging with a pin on the flange 7. The tubular member can be of metal, a flexible pipe being attached to the end 31, or the tube can be of plastic material, having some flexibility, but also of sufficient stiffness to move the valve 15 against the spring 18.

It is also possible to attach a pump to the lower end of the tubular member 25, to enable a sump to be drained by the pump, the oil fed to a central collecting container.

I claim:

1. A drainer for draining liquid from a chamber comprising in combination; a tubular drain plug for insertion in a wall of the chamber, said plug having an outlet and including a tubular axial extension, said extension arranged to project directly into said chamber in contact with said liquid; a port in the side of said extension for direct communication between said chamber and the interior of said extension; a valve in said extension to control flow of liquid through said port from said chamber into the interior of said extension, said valve including a cylindrical sealing surface in sliding contact with the bore of said extension, said valve movable axially in said bore from a first position, said sealing surface positioned between said port and said outlet, preventing flow from said extension through said outlet, to a second position with said sealing surface on the side of said port remote from said outlet; means in said extension resiliently urging said valve to said first position to shut off communication between said chamber and the interior of the plug; and a valve opening and drain member comprising a tube for insertion axially into said plug, said tube having a close fit in said plug, to move said valve axially away from said outlet from said first position to said second position, the tube including a portion having an end surface to contact said valve on insertion of the tube into said plug, said portion having an opening in the side thereof for alignment with the port in said extension to permit flow of liquid from said chamber through said port and said opening into the interior of said tube, said opening so constructed and arranged that communication between said port and said opening commences only after said opening is completely within said plug.

2. A drainer as claimed in claim 1, said valve having a stem extending axially of said axial extension and through a hole in the end thereof, and a compression spring positioned around said stem between said valve and the end of the axial extension.

3. A drainer as claimed in claim 2, said valve having a stem extending axially of said axial extension and through a hole in the end thereof, said stem having an enlargement on the end remote from said valve, said enlargement limiting the movement of the valve away from said end of said extension.

4. A drainer as claimed in claim 1, said portion of said tube comprising a tongue formed on the end of said tube.

5. A drainer as claimed in claim 4, the length of said tongue slightly less than the distance from the outer surface of said plug to the edge of said port toward said outer surface.

6. A combination as claimed in claim 1 including a clip for positioning and retaining said tube in said plug, said clip cooperating with a formation on said drain plug to rotatively locate said tube.

7. A drainer as claimed in claim 1, including a hood positioned over said port, said hood having an orifice extending in a plane normal to the axis of said axial bore, whereby said orifice, when said plug is inserted in a bottom wall of a chamber, faces toward said bottom wall, thereby to provide a syphon effect when said valve member is in the open position.

8. Drainage apparatus for a chamber, said chamber having a bottom wall and a side wall extending upwardly from said bottom wall, comprising a tubular drain plug in said side wall, said plug having an outlet and including a hollow axial extension extending into said chamber, a port in said extension for direct communication between said chamber and the interior of said axial extension, said port positioned facing toward said bottom wall; a valve in said axial extension to control flow of fluid through said port from said chamber into said extension; means resiliently urging said valve to shut off communication between said chamber and the interior of said plug; and a valve opening and drain member comprising a tube for insertion axially into said plug, said tube having a close fit in said plug, to move said valve axially and permit communication between said chamber and said outlet, the tube including a portion extending axially and having an end surface to contact said valve and move said valve axially on insertion of the tube into the plug, said portion having an aperture in the side thereof for alignment with the port in said extension, said aperture positioned so as to commence opening said port to the interior of said plug only after said aperture is fully within said plug.

9. A drainer as claimed in claim 8, said valve comprising a cylindrical valve part the peripheral surface of which is in sliding sealing contact with the interior of said plug, to provide the only control of liquid flow from said chamber into said plug.

10. Apparatus as claimed in claim 9, said portion comprising a tongue formed on the end of said tube and extending only part way peripherally of said tube, the end of said tongue providing said end surface, the length of said tongue such that the cylindrical valve part commences to uncover said port only after said tongue is wholly within said plug.

References Cited

UNITED STATES PATENTS

| | | | |
|---|---|---|---|
| 1,150,420 | 8/1915 | Davis et al. | 141—382 X |
| 1,629,303 | 5/1927 | Phillips | 137—322 X |
| 3,198,016 | 8/1965 | Poorman | 251—339 X |
| 3,387,621 | 6/1968 | Schaff | 251—149.6 X |

WILLIAM F. O'DEA, Primary Examiner

D. R. MATTHEWS, Assistant Examiner

U.S. Cl. X.R.

251—144, 149.6